March 16, 1926.
J. F. SEITZ
1,576,854
METHOD OF MAKING MOTION PICTURE FILMS
Filed Dec. 12, 1922    4 Sheets-Sheet 1
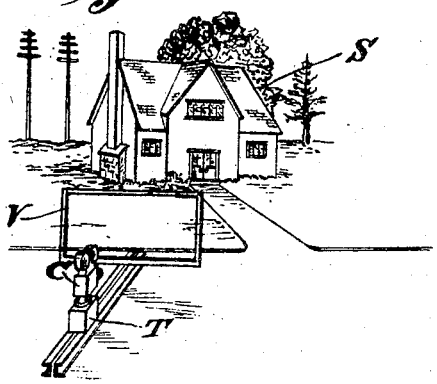
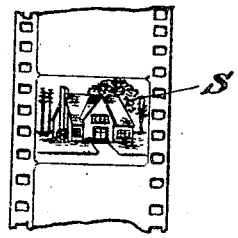
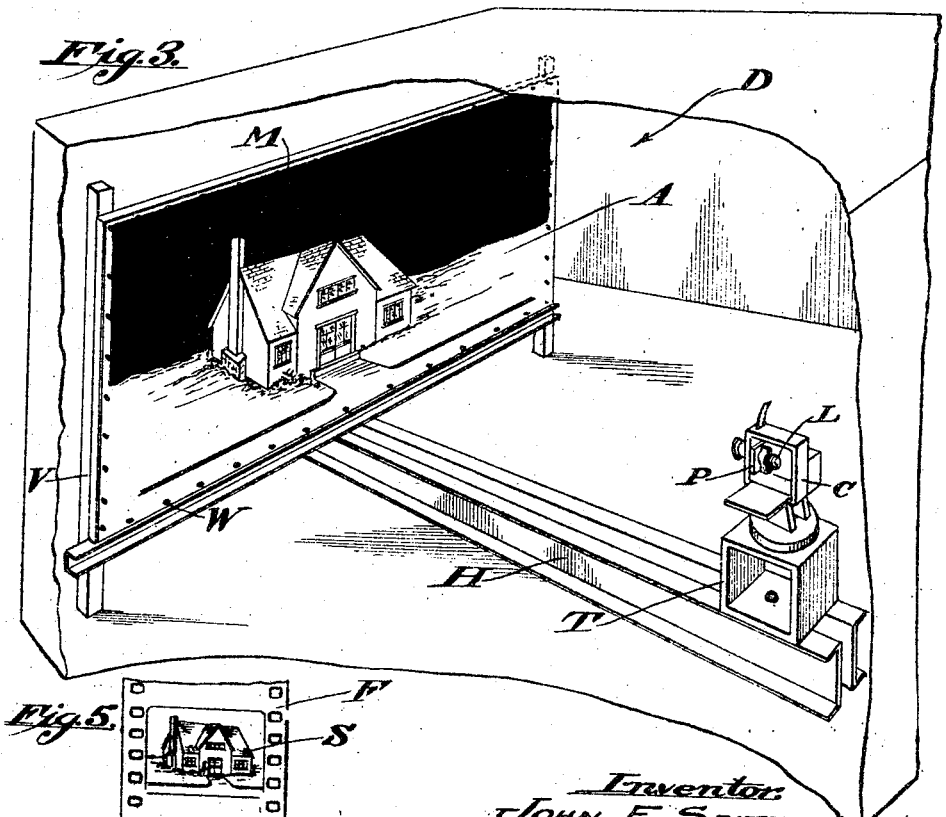
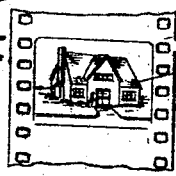
Inventor:
JOHN F. SEITZ
By Hazard and Miller
Atts.

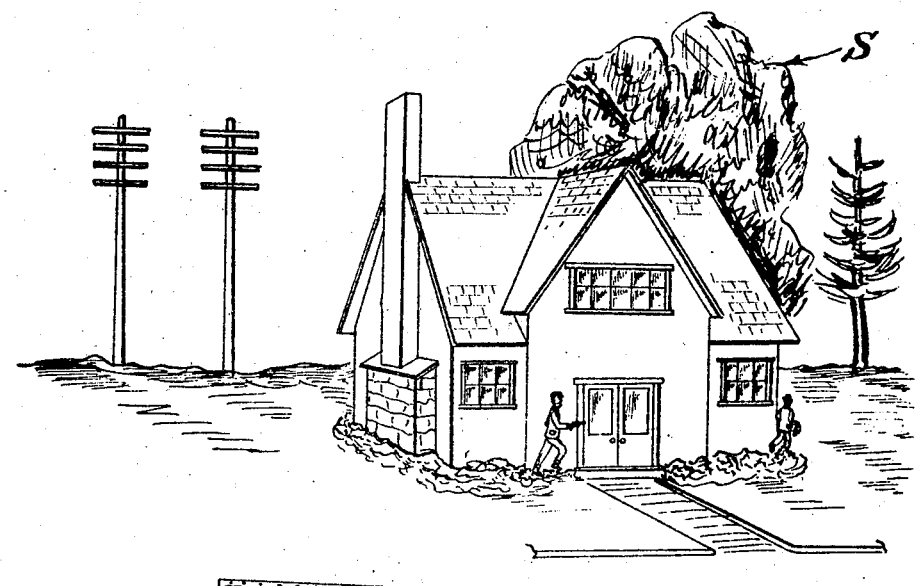
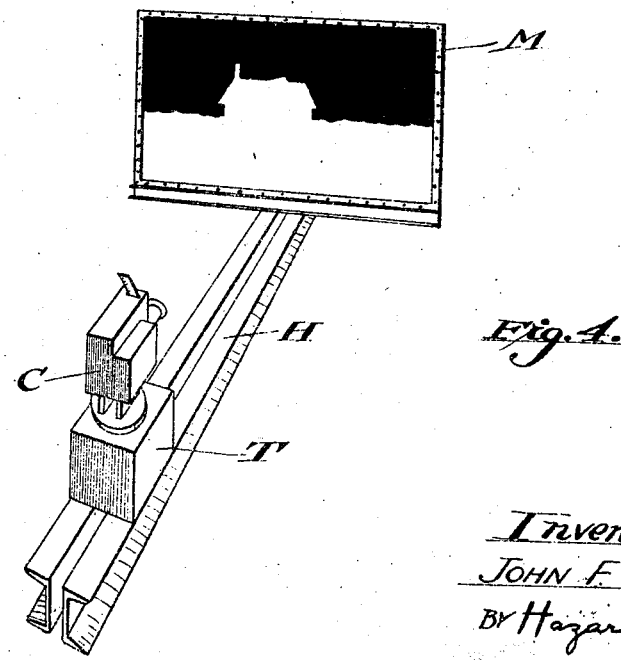
Fig. 4.
Inventor
JOHN F. SEITZ
By Hazard and Miller
Att'ys

March 16, 1926.  
J. F. SEITZ  
1,576,854  
METHOD OF MAKING MOTION PICTURE FILMS  
Filed Dec. 12, 1922   4 Sheets-Sheet 3
_Fig. 6._
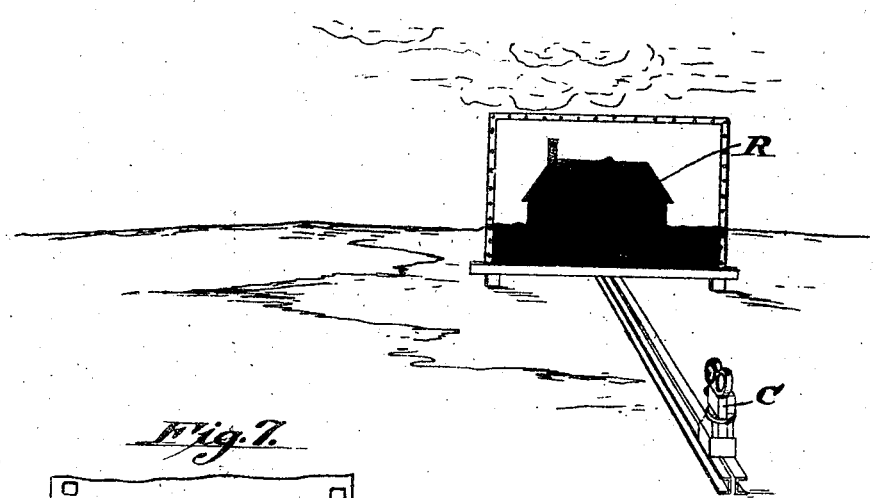
_Fig. 7._
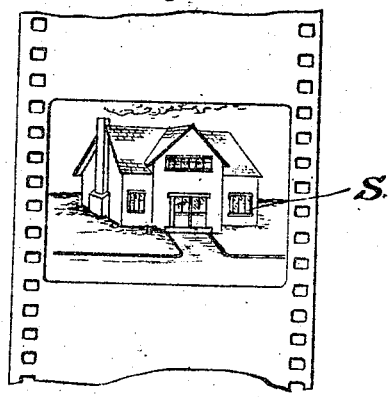
Inventor:  
JOHN F. SEITZ  
By Hazard & Miller  
Attorneys March 16, 1926.
J. F. SEITZ
1,576,854
METHOD OF MAKING MOTION PICTURE FILMS
Filed Dec. 12, 1922    4 Sheets-Sheet 4
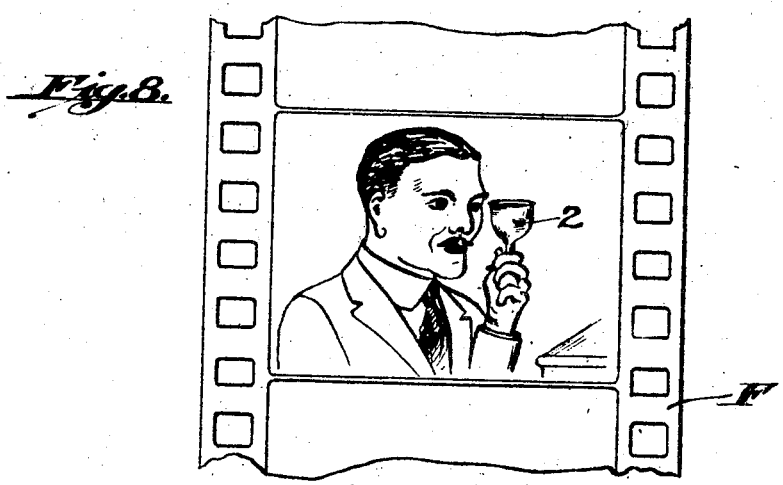
Fig. 8.
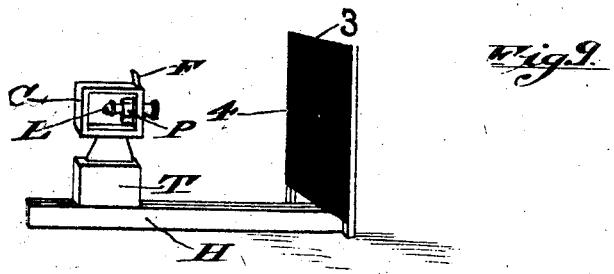
Fig. 9.
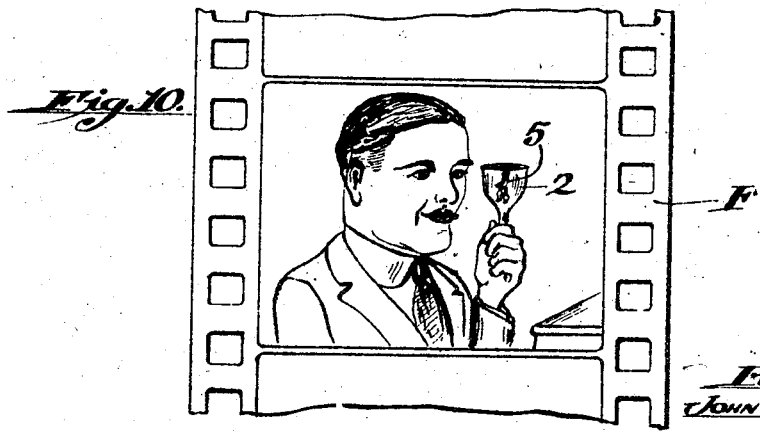
Fig. 10.
Inventor:
John F. Seitz.
By Hazard & Miller
Attorneys Patented Mar. 16, 1926.

1,576,854

UNITED STATES PATENT OFFICE.

JOHN F. SEITZ, OF HOLLYWOOD, CALIFORNIA.

METHOD OF MAKING MOTION-PICTURE FILM. REISSUED

Application filed December 12, 1922. Serial No. 606,400.

*To all whom it may concern:*

Be it known that I, JOHN F. SEITZ, a citizen of the United States, residing at Hollywood, in the county of Los Angeles and State of California, have invented new and useful Improvements in a Method of Making Motion-Picture Films, of which the following is a specification.

My invention relates to multiple exposure work in photography, and is more particularly adapted for motion pictures.

In current systems of double or multiple exposure work, one or more mats or opaque plates are positioned in the motion picture camera between the exposure of certain portions of the film, as is well understood by those skilled in the art. While such system is successful to a certain degree, the field of operation in which it may be employed is limited to the extent that irregular shaped objects cannot be cut out of the scene.

It is an object of this invention to provide a method and apparatus for the effective production of multiple exposure pictures or films.

It is an object to provide for the effective combination of two or more scenes in a composite picture by successive-exposure of the negative.

In the accompanying drawings,

Figure 1 is a perspective showing a scene of which a negative is taken in the first step in my process.

Fig. 2 is a view showing a section of developed picture of the scene taken in the first step.

Fig. 3 is a view showing the picture being projected on a sheet, in a dark house, and the making of a mat thereon.

Fig. 4 shows the first exposure on the scene and the located mat to cut out the background and sky.

Fig. 5 is a view showing the result of the film strip exposure.

Fig. 6 is a perspective showing the second step of film exposure on the reverse mat to take a sky or background.

Fig. 7 is a view of a portion of the developed film after the second exposure.

Fig. 8 shows a close-up picture to be combined with a subsequent exposure.

Fig. 9 shows the step of making the second exposure to form the insert.

Fig. 10 shows the picture including the insert.

A negative of a scene S at which action is to take place is taken by a camera C which is set on location in a substantially fixed position to remain until the film is fully completed. This negative is then inserted into an auxiliary aperture plate P in the camera and a still picture of the scene S is projected in a dark house D upon a sheet A of suitable material such as sheet metal, cardboard or the like through the same lens used in taking the original scene by a lamp L also located in the camera. The dark house may be built around the camera on location.

While the scene is projected upon the sheet as shown in Fig. 3, any part which is not desired to appear in the final picture is given a non-actinic coat, as of black to form a mat the part of the sheet other than the mat is carefully cut out and discarded. The auxiliary plate and lamp are removed from the camera and the mat will mask that part of the scene not desired and is then set up on location at the original scene S and a film is run which results in producing a picture in which the mat will cause such part on the film to appear blank as shown in Figure 5.

The first mat M functions to cut out the upper area of the scene which is filmed, so that the uncovered part is photographed with or without animated figures.

To complete the exposure of the film, a reverse mat R is made which has an edge matching the irregular edge of the first mat M. The reverse mat R is then set in position in front of the camera and in relation to any desired background or skyline, Fig. 6. The undeveloped film is then a second time exposed on the new scene, which results in a picture section of composites, namely, scene of Fig. 1 and scene of Fig. 6; but in each scene filmed complemental mats of reverse positions are separately used exteriorly of the camera.

It is essential that the camera and mats be maintained in the same relative positions, and to this end the sheet upon which the scene is projected and from which the mats are formed is firmly pinned to a vertical frame V by pins W. This frame is secured to a horizontal frame H upon which the camera is adjustably mounted on a stand T.

While I have shown and described one practical embodiment of my process, it will be readily understood that various other scenes and arrangements of scenes may be made without departing from the spirit of the invention as claimed.

For instance, my method may be used to first take a film F of a "close-up" as shown in Fig. 8 of the profile of a person holding a tumbler. A scene may be made to appear in the bowl of the tumbler, and that I accomplish by fixing the camera C on its support H and projecting an image therefrom, by use of the lamp L, onto a black screen or paper 3 placed in front of the camera. Then a portion of the paper is cut out as at 4 at that portion of the projected image in which the insert is to appear.

The film F with its first "take" undeveloped is then placed in the camera and again run. This second exposure will include such scene 5 as may be visible through the hole 4 made in the "mat" or barrier 3.

It will be seen that an important step of my invention is the use of the camera as a lamp box for the projection of a picture onto a sheet, screen or barrier which facilitates the making of a mat trimmed or cut marginally or interiorly to enable its use for covering and exposing given or certain scenes or portions thereof.

Thus an animated "close-up" and an animated distance scene can be effectually secured in a composite film.

What is claimed is:

1. A method of making motion pictures comprising making a negative of a scene, casting an image therefrom onto a sheet positioned at the desired distance in front of the lens of the camera, cutting away a portion of the sheet corresponding to a portion of the image to make a first mat, then making a first exposure of a scene while the rigidly associated first mat is in unchanged relation to the camera, making a second mat by the same means, but reverse from the first mat, to cover the filmed part of the scene, then making the second exposure with the second mat in its proper position to complete the picture.

2. A method of making motion picture films comprising making a negative of a scene, making a plurality of complementary mats, each made by casting an image from the negative on a sheet at a uniform distance from the lens of the camera, and cutting away a portion of the sheet corresponding to that part of the image which it is desired to film separately, said cut away portions of said images being complementary and covering the total area of the image, and making a complete picture on a film by successive exposures thereof with said mats, each exposure being made with one of said mats associated at the same distance from the camera as when the image of the negative was cast upon the sheet.

3. A method of making motion picture films comprising first making a negative of a scene, then casting an image therefrom onto a sheet in fixed relation to the camera, then making a number of matching mats from the sheet by cutting away portions thereof corresponding to parts of the image and making exposures on a film of a scene in which the mats are separately and successively used, the cut away portion of the mats being complementary and covering the total area of the scene.

In testimony whereof I have signed my name to this specification.

JOHN F. SEITZ.